:US005854338A

United States Patent
Hovestadt et al.

[11] Patent Number: 5,854,338
[45] Date of Patent: Dec. 29, 1998

[54] AQUEOUS TWO-COMPONENT BINDERS AND THEIR USE IN COATING AND SEALING COMPOSITIONS

[75] Inventors: Wieland Hovestadt, Krefeld; Lutz Schmalstieg, Köln; Christian Wamprecht, Neuss; Karl-Ludwig Noble, Bergisch Gladbach, all of Germany

[73] Assignee: Bayer Aktiengesellschaft, Leverkusen, Germany

[21] Appl. No.: 57,674

[22] Filed: Apr. 9, 1998

[30] Foreign Application Priority Data

Apr. 14, 1997 [DE] Germany ............... 197 15 427.1

[51] Int. Cl.⁶ .................. C08J 3/00; C08K 3/20; C08L 75/00; C08L 83/00
[52] U.S. Cl. ............. 524/591; 524/588; 524/837; 524/838; 524/839; 524/840
[58] Field of Search ................. 524/588, 591, 524/837, 838, 839, 840

[56] References Cited

U.S. PATENT DOCUMENTS

| | | | |
|---|---|---|---|
| 3,941,733 | 3/1976 | Chang | 260/29.2 TN |
| 4,567,228 | 1/1986 | Gaa et al. | 524/588 |
| 5,041,494 | 8/1991 | Franke et al. | 524/588 |
| 5,075,370 | 12/1991 | Kubitza et al. | 524/591 |
| 5,098,983 | 3/1992 | Mosbach et al. | 528/59 |
| 5,109,057 | 4/1992 | Tsuno et al. | 524/588 |
| 5,252,696 | 10/1993 | Laas et al. | 528/49 |
| 5,336,711 | 8/1994 | Schneider et al. | 524/507 |
| 5,364,955 | 11/1994 | Zwiener et al. | 556/418 |
| 5,387,367 | 2/1995 | Haeberle et al. | 252/182.22 |
| 5,387,642 | 2/1995 | Blum et al. | 524/591 |
| 5,519,089 | 5/1996 | Okamoto et al. | 525/123 |
| 5,614,604 | 3/1997 | Krafcik | 528/28 |

FOREIGN PATENT DOCUMENTS

| | | |
|---|---|---|
| 2090144 | 8/1993 | Canada . |
| 2175530 | 11/1996 | Canada . |
| 814105 | 12/1997 | European Pat. Off. . |
| 2299996 | 10/1996 | United Kingdom . |
| 97/03101 | 1/1997 | WIPO . |

*Primary Examiner*—Patrick D. Niland
*Attorney, Agent, or Firm*—Joseph C. Gil; Thomas W. Roy

[57] ABSTRACT

The present invention relates to a binder composition containing a) 30 to 90 wt. % of an aqueous, hydroxy- and/or amino-functional resin dispersion and b) 10 to 70 wt. % of a curing agent containing alkoxysilyl groups and having a free isocyanate group content of 10 to 23 wt. % and a viscosity of 50 to 10000 mPa·s at 23° C., wherein the molar ratio of the hydroxyl groups of component a) to the isocyanate groups of component b) is 0.5:1 to 2:1.

The present invention also relates to the use of these binder compositions in coating and sealing compositions.

17 Claims, No Drawings

AQUEOUS TWO-COMPONENT BINDERS AND THEIR USE IN COATING AND SEALING COMPOSITIONS

BACKGROUND OF THE INVENTION

1. Field of the Invention

This invention relates to an aqueous, two-component binder composition based on hydroxy- and/or amino-functional, water dilutable resins and curing agents which contain isocyanate and alkoxysilyl groups and to the use thereof in coating and sealing compositions.

2. Description of the Prior Art

Conventional two-component polyurethane coating compositions have gained great significance in the coatings sector due to their outstanding properties. One disadvantage is that relatively large quantities of organic solvents are necessary in most cases for processing. However, in virtually all areas of application, there is increasing demand for high-solids or especially water-borne coating compositions in order to minimize solvent emissions and the associated environmental pollution to the extent possible.

Until only a few years ago, it did not seem possible to use water as the liquid phase in two-component polyurethane coating compositions because isocyanate groups not only react with the hydroxyl groups of the resin but also with water to form urea and carbon dioxide. As a result the pot life, reliability of application, possibility of obtaining adequate blister-free film thicknesses and stability characteristics of the lacquers and coatings are generally degraded to such an extent that they no longer fulfil practical requirements.

Recently, increasing efforts have been made to reduce these problems. DE-A 3,829,587 describes a first possible solution, in which certain polyhydroxy-polyacrylate secondary dispersions are combined with polyisocyanates containing free isocyanate groups to yield aqueous two-component systems.

It has since been found that it is possible to replace the polyacrylate dispersions with other hydroxy-functional resin dispersions, making it possible to vary coating properties. For example, EP-A 557,844 describes two-component polyurethane coatings based on hydroxy-functional primary dispersions, EP-A 543,228 describes such coatings based on polyester-polyacrylate hybrid dispersions, EP-A 741,176 describes such coatings based on extrinsically emulsified alkyd resins, EP-A 496,205 describes such coatings based on urethane-modified polyester dispersions and EP-A 542,105 describes such coatings based on blends of different types of resin.

Polyisocyanates which may be used in the two-component polyurethane coatings may be either hydrophilic or hydrophobic polyisocyanates as described, for example, in EP-A 443,138, EP-A 486,881 and EP-A 540,985. Using hydrophilic polyisocyanates improves the emulsifiability of the polyisocyanate in the resin dispersion, which increases the reliability of application, the compatibility of the components and the gloss of the coatings. However, the additional hydrophilic groups degrade other essential coating properties, especially the water resistance of the coatings and pot life. In addition, the formation of reaction blisters occurs at higher film thicknesses and this problem has not previously been solved.

Dual-crosslinking aqueous polyurethane coating systems having good water resistance have recently become known. In these systems, hydroxy-functional polyacrylate dispersions which additionally contain alkoxysilyl or silanol functions are used blended with hydroxy-functional polyurethane dispersions as the resin component. A polyisocyanate compound is used as the curing agent (DE-A 19,613,629). One problem associated with these products is that the OH- and alkoxysilyl- or silanol-functional dispersions are stable only within a very narrow range of pH and temperature, i.e., they may be produced and formulated only if particular precautions are taken and, thus, may only be used for a few specific areas of application.

An object of the invention is to provide all-purpose, two-component polyurethane coatings having improved water resistance combined with elevated gloss, reduced haze, extended pot life, increased reliability of application and an adequate blister-free film thickness.

Surprisingly, this object could be achieved with the binder composition described hereinafter, which is based on hydroxy- or amino-functional water dilutable resins and curing agents containing isocyanate and alkoxysilyl groups.

SUMMARY OF THE INVENTION

The present invention relates to a binder composition for aqueous, two-component polyurethane coating and sealing compositions which contains a) 30 to 90 wt. % of an aqueous, hydroxy- and/or amino-functional resin dispersion and b) 10 to 70 wt. % of a curing agent containing alkoxysilyl groups and having a free isocyanate group content of 10 to 23 wt. % and a viscosity of 50 to 10000 mPa·s at 23° C., wherein the molar ratio of the hydroxyl groups of component a) to the isocyanate groups of component b) is 0.5:1 to 2:1.

The present invention also relates to the use of these binder compositions in coating and sealing compositions.

DETAILED DESCRIPTION OF THE INVENTION

Any resin dispersions containing hydroxyl and/or amino groups, which are known from aqueous, two-component polyurethane coatings technology, may be used as component a). Processes for the production of these resins are also known from the literature. The resins include polyesters, polyacrylates, polyurethanes, polyureas, polycarbonates and polyethers, which are hydroxy- and/or amino-functional. It is also possible to use hybrid dispersions or mixtures of different dispersions. It is also possible in accordance with the present invention to use non-functional dispersions as a binder component in two-component polyurethane coating compositions.

Curing agent component b) is selected from organic polyisocyanates containing aliphatically, cycloaliphatically, araliphatically and/or aromatically attached free isocyanate groups and having an average NCO functionality of 2.0 to 5.0, preferably 2.2 to 4.0. At least a portion of the organic polyisocyanates used as curing agent b) also contain alkoxysilyl groups.

Examples of curing agents that do not contain alkoxysilyl groups are include "lacquer polyisocyanates" prepared from hexamethylene diisocyanate (HDI), 1-isocyanato-3,3,5-trimethyl-5-isocyanatomethyl -cyclohexane (IPDI), bis (isocyanatocyclohexyl)methane, other aliphatic diisocyanates and mixtures of these diisocyanates. "Lacquer polyisocyanates" are adducts prepared from diisocyanates and containing biuret, urethane, uretidione and/or isocyanurate groups. Excess starting diisocyanate is generally removed from the lacquer polyisocyanates to obtain a residual content of less than 0.5% monomer in known manner, preferably by distillation. Processes for the production of lacquer polyisocyanates are described, for example, in U.S. Pat. Nos. 3,124,605, 3,358,010, 3,903,126, 3,903,127, 3,976,622 or 4,324,879, the disclosures of which are herein incorporated by reference.

Also suitable are aromatic polyisocyanates, for example lacquer polyisocyanates prepared from 2,4-diisocyanatotoluene or mixtures thereof with 2,6-diisocyanatotoluene, or 4,4'-diisocyanatodiphenylmethane or mixtures thereof with its isomers and/or higher homologs. Mixtures of the lacquer polyisocyanates may also be used.

It is also possible to use hydrophilic polyisocyanates alone or blended with the non-hydrophilic polyisocyanates previously described to improve the incorporability of the curing agents. Hydrophilicity may be achieved, for example, by incorporating anionic, cationic or nonionic groups or by blending with external emulsifiers such as polyethers. Suitable hydrophilic polyisocyanates are described, for example, in EP-A 443,138 (U.S. Pat. No. 5,098,983, herein incorporated by reference), EP-A 469,389, EP-A 486,881 (U.S. Pat. No. 5,387,367, herein incorporated by reference), EP-A 510,438, EP-A 540,985 (U.S. Pat. No. 5,252,696, herein incorporated by reference), EP-A 645,410 (U.S. Pat. No. 5,468,804, herein incorporated by reference), EP-A 697,424 (U.S. Pat. No. 5,587,421, herein incorporated by reference) and EP-A 728,785.

The curing agents b), which are essential to the invention, differ from the lacquer polyisocyanates because they additionally contain alkoxysilyl groups. These alkoxysilyl-modified polyisocyanates are produced by reacting of the isocyanate groups of the preceding polyisocyanates with known amino-functional alkoxysilyl compounds corresponding to formula I,

wherein
  R represents hydrogen a linear or branched alkyl group containing 1 to 4 carbon atoms,
  n represents an integer from 2 to 4, preferably 3, and
  X, Y and Z represent identical or different organic residues containing 1 to 30 carbon atoms, preferably 1 to 4 carbon atoms, provided that at least one of these residues represents an alkoxy group containing 1 to 4 carbon atoms, preferably a methoxy or ethoxy group.

Examples of suitable amino-functional alkoxysilyl compounds include 3-amino-propyltrimethoxysilane, 3-aminopropyltriethoxysilane or 3-aminopropylmethyldiethoxysilane. Examples of alkoxysilyl compounds containing secondary amino functions which may preferably be used are N-methyl-3-aminopropyltrimethoxysilane, N-butyl-3-aminopropyl-trimethoxysilane or N-phenyl-3-aminopropyltrimethoxysilane.

Particularly preferred amino-functional alkoxysilyl compounds are those obtained in accordance with U.S. Pat. No. 5,364,955 (herein incorporated by reference) by reacting the aminosilanes of formula I, wherein R represents hydrogen, with maleic or fumaric acid esters corresponding to formula II

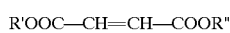

wherein
  R' and R" are identical or different (cyclo)alkyl residues containing 1 to 8 carbon atoms.

Maleic acid dimethyl ester and/or maleic acid diethyl ester are preferably used.

In the context of the present invention, it has been observed that, irrespective of the quantity used, the presence of these specific alkoxysilyl compounds allows particularly good incorporability of component b) in component a). The alkoxysilyl groups also ensure that the coatings may be reliably applied to obtain particularly elevated gloss without embrittlement.

The reaction of the polyisocyanates with the amino-functional alkoxysilyl compounds may be carried out by incrementally adding the aminosilyl compound to the polyisocyanate, generally at a temperature of 0° C. to 120° C., preferably 20° C. to 80° C.

The quantity of the amino-functional alkoxysilyl compound used to modify the polyisocyanate component is selected such that the molar ratio of alkoxysilyl groups to isocyanate groups in the resulting curing agent b) is 0.008:1 to 0.5:1, preferably 0.008:1 to 0.2:1 and more preferably 0.015:1 to 0.2:1.

It is also possible to react polyisocyanates with the amino-functional alkoxysilyl compounds according to the invention at a higher molar ratio up to an NCO/NH equivalent ratio of 1/1, and subsequently to blend the resulting reaction products with polyisocyanates, such that these mixtures comply with the previously disclosed requirements for curing agent b).

The molar ratio of hydroxyl groups of component a) to isocyanate groups of component b) is 0.5:1 to 2:1, preferably 0.5:1 to 1.5:1 and more preferably 0.75:1 to 1.5:1.

Curing agent b) generally has a viscosity at 23° C. of 50 to 10000, preferably of 50 to 2000 mPa·s when measured in a cone-plate viscosimeter according to DIN 53 019 at D=40. If necessary, the polyisocyanates may be blended with small quantities of inert solvents in order to reduce the viscosity to a value within these ranges. However, the quantity of solvent is calculated such that at most 20 wt. %, preferably at most 10 wt. %, of solvent is present in the ultimately obtained coating compositions according to the invention; any solvent optionally present in resin dispersions a) is also included in the calculation.

Suitable solvents include aliphatic or aromatic hydrocarbons (such as xylene, toluene or solvent naphtha), N-methylpyrrolidone, diethylene glycol dimethyl ether, acetone, methyl ethyl ketone, methyl isobutyl ketone, ethyl acetate, butyl acetate, methoxypropyl acetate and mixtures of these or other inert solvents.

The aqueous binder composition is produced by emulsifying curing agent b) into the aqueous resin a). Known coating additives may be incorporated into components a) or b) before component b) is added. These additives include defoaming agents, thickeners, flow-control agents, pigments, dispersion aids and also solvents. The required working viscosity is established with water. In comparison with prior art polyisocyanates, curing agent b) according to the invention may generally be readily emulsified into the aqueous resin component a). In most cases, therefore, simple emulsification methods are sufficient (for example, a mechanical stirrer or even simple manual mixing of the two components) to obtain coatings with very good properties. Mixing methods involving greater shear energy, such as jet dispersion, as described in Farbe & Lack 102/3 1996, pp. 88–100, may also be used.

The coating compositions according to the invention obtained in this manner are suitable for any areas of application in which coatings having superior performance are needed, such as coating mineral building materials, road surfaces, wood and derived timber products, metallic surfaces, plastics or paper and also for bonding various materials. They may be used, for example, as primers, surfacers, pigmented topcoats and clear coatings, in applications such as industrial coatings, automotive OEM or refinish coatings. The coating compositions are particularly suitable for applications in which the coating must be reliably applied to obtain elevated water resistance, e.g., in automotive refinish, (large) vehicle and industrial coating applications.

The coatings may be applied by various spray processes, such as compressed air, airless or electrostatic spraying, using one- or two-component spraying equipment. The coatings may also be applied by brushing, roller or coating knife application.

The coating is generally dried and cured under standard temperature conditions, i.e., without heating the coating. The binder composition according to the invention may also be used to produce coating compositions which, once applied, are dried and cured at an elevated temperature of 40° to 250° C., preferably 40° to 150° C.

The invention is further illustrated but is not intended to be limited by the following examples in which all parts and percentages are by weight unless otherwise indicated. Viscosity measurements were made in a cone-plate viscosimeter according to DIN 53 019 at D=40.

EXAMPLES

Production of the curing agent component b)

Starting polyisocyanates used

Polyisocyanate A 870 g of an isophorone diisocyanate-based polyisocyanurate polyisocyanate having an NCO content of 11.5% and a viscosity of 2000 mPa·s at 23° C. as a 70% solution in 1:1 methoxypropyl acetate/xylene (Desmodur Z4470, commercial product of Bayer AG) were initially introduced into a vessel and reacted at 100° C. with 93 g of a polyether produced by ethoxylation of methanol and having an average molecular weight of 500. As soon as a constant NCO content was obtained, the mixture was diluted to a solids content of 70% with 1:1 methoxy-propyl acetate/xylene.

The resulting water dispersible polyisocyanate had the following properties:

NCO content: 9.6%

Viscosity: 500 mPa·s (23° C.)

Polyisocyanate B

A solvent-free polyisocyanurate polyisocyanate produced by catalytic trimerization of hexamethylene diisocyanate and having an NCO content of 23% and a viscosity of 1200 mPa·s (23° C.).

Polyisocyanate C

A water dispersible, hexamethylene diisocyanate-based polyisocyanate having an NCO content of 17.2% and a viscosity of 3500 mPa·s at 23° C. (Bayhydur N3100, commercial product of Bayer AG).

Example 1

Production of a curing agent b) according to the invention 45.9 g of a hexamethylene diisocyanate-based polyisocyanurate polyisocyanate having an NCO content of 21.5% and a viscosity of 3000 mPa·s at 23° C. (Desmodur N3300, commercial product of Bayer AG) were reacted with 83.1 g of an amino-functional alkoxysilyl compound produced according to U.S. Pat. No. 5,364,955, Example 5 (reaction product of maleic acid diethyl ester and (3-amino-propyl) trimethoxysilane) at room temperature until no NCO groups were detected by IR monitoring. The reaction product was then blended with 343 g of polyisocyanate B, 490 g of polyisocyanate A and 38 g of methoxypropyl acetate.

Example 2

Production of a curing agent b) according to the invention 473.6 g of polyisocyanate A, 375.6 g of polyisocyanate B and 57.8 g of methoxy-propyl acetate were initially introduced into a reaction vessel. 93 g of the amino-functional alkoxysilyl compound described in Example 1 were slowly added dropwise at room temperature. Stirring was continued for an additional hour at room temperature and a polyisocyanate having the following characteristics was obtained:

NCO content: 12.0%

Viscosity: 2100 mPa·s (23° C.)

Example 3

Comparison curing agent

A mixture was prepared from 400 g of polyisocyanate B, 571 g of polyisocyanate A and 29 g of methoxypropyl acetate.

Example 4

Production of a curing agent b) according to the invention 19.5 g of the hexamethylene diisocyanate-based polyisocyanurate polyisocyanate described in Example 1 were reacted at room temperature with 35.4 g of the amino-functional alkoxysilyl compound described in Example 1 until no NCO groups were detected by IR monitoring.

The reaction product was then mixed with 542 g of polyisocyanate C and 397 g of polyisocyanate B and diluted to a solids content of 80% with methoxypropyl acetate.

Example 5

Comparison curing agent

A mixture was prepared from 80% solutions of 577 g of polyisocyanate C and 423 g of polyisocyanate B in methoxypropyl acetate.

APPLICATION EXAMPLES

Example 6

Automotive refinish and large vehicle primer surfacer

An emulsion copolymer based on methyl methacrylate, n-butyl acrylate, hydroxypropyl methacrylate, acrylic acid, a commercial emulsifier and ammonium peroxydisulphate as the initiator was used as water dilutable resin component 1. The emulsion copolymer had a solids content of 41 wt. %, an OH content of 2.0 wt. %, based on resin solids, an acid number of 23, based on resin solids, and a pH of 7.3.

The polyisocyanates from Examples 1 to 3 were used as the curing agents. An NCO/OH equivalent ratio of 1:1 was maintained. Identical quantities of additives and extenders were used, based on resin solids.

The following constituents were used to produce a primer surfacer (quantities in g).

| Surfacer 1 (according to the invention) | |
|---|---|
| | Weight in g |
| Component 1 | |
| Resin component 1 | 479.8 |
| BYK 023, defoamer, 19% in water, BYK Chemie West | 2.9 |
| Surfynol 104, wetting agent, diluted to 50% with ethylene glycol monobutyl ether, Air Products | 7.8 |
| Corrosion inhibitor L1, 100% Erbslöh Krefeld | 2.3 |
| Titanium dioxide, R-KB 4, Bayer AG | 74.2 |
| Lamp black 101, Degussa AG | 1.9 |
| Aerosil R 972, Degussa AG | 8.3 |
| Talcum AT 1, Norwegian Talc Deutschland GmbH | 66.3 |
| Silica flour F 500, Quarzwerk GmbH Cologne-Frechen | 26.5 |
| ASP 602, extender, Chemie-Mineralien KG Bremen | 79.5 |
| Blanc fixe M, extender, Sachtleben Chemie GmbH Duisburg | 106.1 |
| Deionized water | 146.6 |
| Component 2 | |
| Curing agent from Example 1 | 77.0 |
| Total quantity | 1079.2 |

| Surfacer 2 (according to the invention) | |
|---|---|
| | Weight in g |
| Component 1 | |
| Resin Component 1 | 479.8 |
| BYK 023, defoamer, 19% in water, BYK Chemie Wesel | 2.9 |
| Surfynol 104, wetting agent, diluted to 50% with ethylene glycol monobutyl ether, Air Products | 7.8 |
| Corrosion inhibitor L1, 100% Erbslöh Krefeld | 2.3 |
| Titanium dioxide, R-KB 4, Bayer AG | 74.7 |
| Lamp black 101, Degussa AG | 1.9 |
| Aerosil R 972, Bayer AG | 8.4 |
| Talcum AT 1, Norwegian Talc Deutschland GmbH | 66.7 |
| Silica flour P 500, Quarzwerk GmbH Cologne-Frechen | 26.7 |
| ASP 602 ®, extender, Chemie Mineralien KG Bremen | 80.0 |
| Blanc fixe M, extender, Sachtleben Chemie GmbH Duisburg | 147.6 |
| Deionized water | 147.6 |
| Component 2 | |
| Curing agent from Example 2 | 80.9 |
| Total quantity | 1086.5 |

| Surfacer 3 (comparison) | |
|---|---|
| | Weight in g |
| Component 1 | |
| Resin Component 1 | 479.8 |
| BYK 023, defoamer, 19% in water, BYK Chemie Wesel | 2.8 |
| Surfynol l04, wetting agent, diluted to 50% with ethylene glycol monobutyl ether, Air Products | 7.5 |
| Corrosion inhibitor L1, Bayer AG | 2.2 |
| Titanium dioxide, R-KB 4, Bayer AG | 71.4 |
| Lamp black 101, Degussa AG | 1.8 |
| Aerosil R 972, Bayer AG | 8.0 |
| Talcum AT 1, Norwegian Talc Deutschland GmbH | 63.8 |
| Silica flour F 500, Quarzwerk GmbH Cologne-Frechen | 25.5 |
| ASP 602, extender, Chemie-Mineralien KG Bremen | 76.5 |
| Blanc fixe M, extender, Sachtleben Chemie GmbH Duisburg | 102.1 |
| Deionized water | 147.8 |
| Component 2 | |
| Curing agent from Example 3 | 66.0 |
| Total quantity | 1055.2 |

Component 1 was prepared by homogeneously mixing resin component 1, the additives and extenders with a stirrer (approx. 1000 rpm), grinding for 30 minutes in a bead mill and adjusting with water to a viscosity of 15 seconds (DIN 6 mm cup, 23° C.). Component 2 was then added with stirring (approx. 800 rpm) and mixed in homogeneously. Surfacer 1 had a solids content of 56.2 wt. % and a pH value of 7.8; surfacer 2 had a solids content of 55.8 wt. % and a pH value of 7.9; and surfacer 3 had a solids content of 54.6 wt. % and a pH value of 7.9.

The stability of viscosity over a period of at least 3 hours was tested by adjusting the surfacers to a drain time of 36 s (DIN 53 211, 4 mm nozzle, 23° C.) and determining the drain time hourly.

The two-component PUR surfacer was applied using a spray gun directly onto degreased, keyed steel sheets (15×30 cm) to a film thickness of approx. 60 μm. A film thickness wedge was applied onto a second keyed aluminum sheet having dimensions 40×40 cm in order to determine the blistering limit and solvent resistance. The blistering limit was above 100 μm for all the surfacers.

After application, the sheets were cured at room temperature for 30 minutes and then at 60° C. for 30 minutes before being cooled to room temperature. After this treatment, both the dry sandability (320 grade sandpaper) and wet sandability (800 orade sandpaper) of all the surfacers were very good.

Paper was then used to mask half of each of the sheets and the unmasked area was coated with a commercial solvent-based, black pigmented, two-component PUR topcoat coating composition based on a polyacrylate polyol and an aliphatic polyisocyanate (Permacron Autolack Serie 257/MS Harter plus 3030, Spiess-Hecker) to obtain a film thickness of approx. 60 μm. The black topcoat is useful for revealing blisters and craters particularly clearly. The topcoat was also dried for 30 minutes at room temperature and 30 minutes at 60° C. After additional storage for 3 days at room temperature, König pendulum damping (DIN 53 157) was tested, as was the resistance of the surfacers to water and various solvents by application of a saturated cotton wool swab.

The coated steel sheets were also subjected to special moisture exposure testing at 100% atmospheric humidity and a temperature of 40° C. (condensation test, DIN EN ISO 2409). The reverse side and edges of the sheet were masked to prevent corrosion. Also, both a portion of the sheet coated only with the surfacer and a portion of the sheet coated with the surfacer and topcoat were masked with colorless adhesive tape. This area was thus protected from the action of water and acts as a reference during subsequent evaluation. The sheets were exposed to the moist atmosphere at 40° C. (water temperature 50° C.) for 72 hours and then evaluated. The colorless adhesive tape was removed and both the surfacer and topcoat of the exposed and unexposed areas were compared visually. The adhesion of the surfacer and topcoat were also tested (crosshatching). The test results are set forth in the following table.

| | | Surfacer 1 | Surfacer 2 | Surfacer 3 |
|---|---|---|---|---|
| Viscosity profile, drain time, sec (DIN 4 mm cup) | immediate | 36 | 36 | 36 |
| | after 60 min | 31 | 30 | 22 |
| | after 120 min | 30 | 30 | 19 |
| | after 180 min | 30 | 31 | 20 |
| König pendulum damping, sec (after 30 min 60° C. + 2 h room temperature) | | 102 | 106 | 112 |

-continued

|  | Surfacer 1 | Surfacer 2 | Surfacer 3 |
|---|---|---|---|
| Solvent resistance (30 min 60° C. + 3 d room temperature)[1] | | | |
| Exposure 30 min water | 0 | 0 | 0 |
| 1 min 1:1 isopropanol/water | 2 | 2 | 2 |
| 1 min ethylene glycol mono-butyl ether | 1 | 1 | 1 |
| 1 min 1:1 mixture of methoxy-propyl acetate/xylene | 3 | 3 | 3 |
| Condensation test (72 h, 40° C.)[2] | | | |
| Adhesion: surfacer/surfacer + topcoat | 0/0–1 | 0/0 | 4/3 |
| Blistering: surfacer/surfacer + topcoat | 0/0–1 | 0/0–1 | 4/4 |

[1] 0 = best value (no change), 5 = poorest value (severely attacked)
[2] 0 = best value (no change), 5 = poorest value (severe loss of adhesion or very severe blistering)

Discussion of results:

In comparison with surfacer 3, surfacers 1 and 2 have distinctly better viscosity stability. The hardness, sandability, blistering limit and solvent resistance of surfacers 1 to 3 were essentially equally good. Surfacers 1 and 2 exhibit distinct advantages after three days exposure to moisture at 40° C. There were virtually no discernible differences between the unexposed, masked area and the exposed area of either the surfacer or the topcoat. In contrast, the adhesion of surfacer 3 was distinctly poorer in the exposed area than in the unexposed, masked area and, unlike the unexposed area (no blisters), the exposed area was covered with small blisters.

Example 7
Pigmented two-component polyurethane topcoat

A water dilutable polyacrylate dispersion based on methyl methacrylate, hydroxy-ethyl methacrylate, butyl acrylate, acrylic acid with di-tert.-butyl peroxide as the initiator and dimethylethanolamine as the neutralizing agent was used as the water dilutable resin component 2. The polyacrylate dispersion had a solids content of approx. 45 wt. % in an 85/7.5/7.5 mixture of water/ solvent naphtha 100 solvent/2-butoxy-ethanol; an OH content of approx. 3.3 wt. %, based on resin solids; an acid number of approx. 25, based on resin solids; and a pH of approx. 8.0.

The curing agents from Examples 4 and 5 were used as the polyisocyanates. An NCO/OH equivalent ratio of 1.5:1 was maintained. Based on resin solids, the same quantities of additives and pigments were used.

The following constituents were used to produce a pigmented topcoat composition (quantities in g).

Topcoat 1 (according to the invention)

| | Weight in g |
|---|---|
| Component 1 | |
| Resin Component 2 | 333.7 |
| Surfynol 104E, wetting agent, Air Products | 7.6 |
| Titanium dioxide, Bayertitan R-KB-4, Bayer AG | 282.6 |
| Water | 45.3 |
| Formulation of coating composition | |
| Resin Component 2 | 152.5 |
| Acrysol RM 8, thickener, Rohm & Haas Deutschland GmbH, Frankfurt am Main, diluted to 20% solids with ethanol | 5.2 |
| BYK 346, substrate wetting agent, BYK-Chemie Wesel | 2.0 |
| BYK 380, flow-control agent, BYK-Chemie Wesel | 3.0 |
| Component 2 | |
| Curing agent from Example 4 | 179.1 |
| Total quantity | 1011.0 |

Topcoat 2 (comparison)

| | Weight in g |
|---|---|
| Component 1 | |
| Resin Component 2 | 333.7 |
| Surfynol 104 E, wetting agent, Air Products | 7.4 |
| Titanium dioxide, Bayertitan R-KB-4, Bayer AG | 274.3 |
| Water | 45.3 |
| Formulation of coating composition | |
| Resin component 2 | 152.5 |
| Acrysol RM 8, thickener, Rohm & Haas Deutschland GmbH, Frankfurt am Main, diluted to 20% solids content with ethanol | 5.0 |
| BYK 346, substrate wetting agent, BYK-Chemie Wesel | 1.9 |
| BYK 380, flow-control agent, BYK-Chemie Wesel | 2.9 |
| Component 2 | |
| Curing agent from Example 5 | 168.1 |
| Total quantity | 991.1 |

Component 1 was homogenized for 15 minutes with a high-speed stirrer (peripheral speed 10 m/s) and then ground for 30 minutes in a bead mill. Component 1 was then homogeneously mixed by stirring (approx. 800 rpm) with the coating composition constituents. Component 2 was then added and a homogeneous mixture was produced by stirring (approx. 2000 rpm, 2 minutes). The mixture was adjusted with water to a working viscosity of approx. 30 seconds (drain time from a DIN 4 mm cup, 23° C.). Topcoat composition 1 had a solids content of 52.3% and a pH value of 8.1; topcoat composition 2 had a solids content of 52.8% and a pH value of 8.2.

The aqueous two-component PUR coating compositions were applied onto iron phosphated steel sheets (Bonder WH 60 OC) with a spray gun and dried at room temperature. The drying rate was determined (DIN 53 150). The dry film thickness was approx. 35 μm for both films.

König pendulum damping (DIN 53 157), Gardner gloss (DIN 67 530), Erichsen indentation (DIN ISO 1520), adhesion (DIN 53 151) and resistance to acetone and xylene (5 minutes' application of a saturated cotton wool swab) were then tested. The water resistance of the films was tested after drying for 24 hours by immersing the sheets, protected by adhesive tape on the reverse side and edges, in a water bath (23° C.). The test criteria here were adhesion, reduction in gloss and blistering (DIN 53 209). The test results are set forth in the following sable.

| Test | Topcoat 1 | Topcoat 2 |
|---|---|---|
| Drying: dust dry/tack-free, hrs | 3/6 | 3/6.5 |

-continued

|  | | Topcoat 1 | Topcoat 2 |
|---|---|---|---|
| Gardner gloss, 20°/60°, haze | | 74/85 | 71/84 |
| König pendulum damping, sec | after 1 day | 84 | 84 |
| | after 7 days | 88 | 83 |
| | after 14 days | 92 | 87 |
| Erichsen indentation, mm | after 1 day | 9 | 9 |
| | after 7 days | 9 | 9 |
| | after 14 days | 9 | 9 |
| Adhesion, crosshatching[1] | after 1 day | 0 | 0 |
| | after 7 days | 0 | 1 |
| | after 14 days | 1 | 1 |
| Acetone resistance[2] | after 1 day | 1 mw | 1 mw |
| | after 7 days | 1 mw | 1 mw |
| | after 14 days | 1 mw | 1 mw |
| Xylene resistance[3] | | 1 h | 1 w |
| | | 1 mh | 1 mh |
| | | 0 mh | 0 mh |
| Water immersion test | | | |
| Adhesion, crosshatching[1] | initial value | 0 | 0 |
| | after 1 day | 1 | 2 |
| | after 3 days | 3 | 5 |
| | after 7 days | 5 | 5 |
| Reduction in gloss, 20°/60°, haze | initial value | 76/87 | 75/87 |
| | after 1 hour | 73/86 | 75/87 |
| | after 3 hours | 74/86 | 74/87 |
| | after 5 hours | 75/87 | 73/87 |
| | after 7 hours | 75/87 | 66/84 |
| | after 1 day | 73/85 | 38/59 |
| | after 7 days | 70/84 | 19/33 |
| Blistering[3] | initial value | no change | no change |
| | after 1 day | no change | m5/g1 |
| | after 7 days | no change | m5/g2 |
| | after 14 days | m5/g1 | m5/g3 |

[1] 0 = best value, 5 = poorest value
[2] m = matt, w = soft, h = hard; 0 = best value (no change), 5 = poorest value (completely attacked)
[3] m5 = very numerous blisters; g1 = very small blisters, g5 = very large blisters Discussion of results:

There were virtually no differences between topcoat 1 and topcoat 2 with regard to drying, gloss, film hardness, film elasticity, adhesion and solvent resistance. The decisive difference emerges in the water immersion test with regard to water resistance. After 7 days, the coating prepared from topcoat composition 1 exhibited a hardly perceptible decrease in gloss and no blisters. In contrast, the gloss of the coating prepared from topcoat composition 2 was considerably reduced after only 1 day and the coating was already covered with very small blisters. After 7 days, the coating exhibited a very severe decrease in gloss and was covered with medium-sized blisters.

Example 8

Two-component PUR clear coating composition

Resin component 2 from Example 7 was used as the resin component. The curing agents from Examples 4 and 5 were used as the crosslinking agents. An NCO/OH equivalent ratio of 1.5:1 was maintained. Identical quantities of additives and extenders were used, based on resin solids.

The following constituents were used to produce a two-component PUR clear coating composition (quantities in g).

| Clear coating composition 1 (according to the invention) | |
|---|---|
| | Weight in g |
| Component 1 | |
| Resin Component 2 from Example 7 | 589.6 |
| Surfynol 104, wetting agent, 100% diluted to 50% with ethylene glycol monobutyl ether, Air Products | 13.4 |
| Borchigel PW 25, thickener, 25% in 1:1 propylene glycol/water, Borchers GmbH Monheim | 1.8 |
| Component 2 | |
| Curing agent from Example 4 | 227.7 |
| Total quantity | 832.5 |

| Clear coating composition 2 (comparison) | |
|---|---|
| | Weight in g |
| Component 1 | |
| Resin Component 2 from Example 7 | 598.2 |
| Surfynol 104, wetting agent, 100% diluted to 50% with ethylene glycol monobutyl ether, Air Products | 13.0 |
| Borchigel PW 25, thickener, 25% in 1:1 propylene glycol/water, Borchers GmbH Monheim | 1.7 |
| Component 2 | |
| Curing agent from Example 5 | 206.7 |
| Total quantity | 819.6 |

Component 1 was mixed with the additives with stirring and adjusted to a viscosity of 50 seconds (DIN 6 mm cup, 23° C.). Component 2 was then added with stirring (1000 rpm). The working viscosity was adjusted to 24 seconds (DIN 4 mm cup, 23° C.) with water. Clear coating composition 1 had a solids content of 46.3% and a pH of 8.1, clear coating composition 2 had a solids content of 44.8% and a pH of 8.2.

The aqueous, two-component PUR clear coating compositions were applied by means of a spray gun onto metal sheets previously coated with a solvent-based two-component PUR surfacer and a solvent-based two-component PUR metallic basecoat coating composition (metallic magnetite blue). A film thickness wedge was sprayed on to determine the blistering limit. Three spray passes were performed with a flashing-off period of 15 minutes between each pass. The sheets were then dried at room temperature for 30 minutes and at 60° C. for 30 minutes. Coating hardness was determined by applying the clear coating compositions to a film thickness of approx. 50 μm directly onto glass sheets and drying as above.

König pendulum damping (DIN 53 157, glass sheet), Gardner gloss and haze (DIN 67 530) and resistance to water and various solvents (on sheet metal for coatings having a film thickness of approx. 60 μm) were then determined. The test results are set forth in the following table.

| Test | | Topcoat 1 | Topcoat 2 |
|---|---|---|---|
| Blister-free film thickness, μm | | 110 | 80 |
| König pendulum damping, sec | immediate | 38 | 40 |
| | after 1 day | 115 | 114 |
| | after 7 days | 142 | 138 |
| Gardner gloss, 20° | | 84 | 83 |
| Haze, Hazen gloss value | | 16.4 | 37.2 |
| Water resistance, 1 hour's exposure | immediate | 2 | 3 |
| | after 1 day | 1 | 1–2 |
| | after 7 days | 0 | 0 |
| Premium petrol resistance 1 hour's exposure | immediate | 2 | 3 |
| | after 1 day | 1 | 1–2 |
| | after 7 days | 0 | 0 |
| Methoxypropyl acetate resistance 5 minutes' exposure | immediate | 3 | 3 |
| | after 1 day | 1 | 2 |
| | after 7 days | 0 | 1 |
| Xylene resistance 5 minutes' | immediate | 3 | 3 |

-continued

| Test | | Topcoat 1 | Topcoat 2 |
|---|---|---|---|
| exposure | after 1 day | 2 | 2 |
| | after 7 days | 1 | 1 |

Discussion of results:

Greater film thicknesses may be applied without blistering with clear coating composition 1 than with clear coating composition 2. While clear coating 1 has approximately equal gloss, it has substantially lower haze than clear coating 2 and thus a better, clearer appearance. Clear coating 1 had slightly better water and solvent resistance than clear coating 2.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A binder composition for aqueous, two-component polyurethane coating and sealing compositions which comprises
    a) 30 to 90 wt. % of an aqueous, hydroxy- and/or amino-functional resin dispersion and
    b) 10 to 70 wt. % of a curing agent component containing alkoxysilyl groups and having a free isocyanate group content of 10 to 23 wt. % and a viscosity of 50 to 10000 mPa·s at 23° C., wherein the molar ratio of the hydroxyl groups of component a) to the isocyanate groups of component b) is 0.5:1 to 2:1.

2. The binder composition of claim 1 wherein said alkoxysilyl groups are incorporated into component b) by reacting isocyanate groups with amino-functional alkoxysilyl compounds corresponding to formula (I)

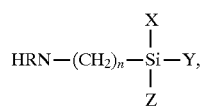

wherein

R represents hydrogen or a linear or branched alkyl group containing 1 to 4 carbon atoms, n represents an integer from 2 to 4 and X, Y and Z represent identical or different organic residues containing 1 to 30 carbon atoms, provided that at least one of the residues represents an alkoxy group containing 1 to 4 carbon atoms.

3. The binder composition of claim 1 wherein

R represents a linear or branched alkyl residue containing 1 to 4 carbon atoms and X, Y and Z represent identical or different organic residues containing 1 to 4 carbon atoms, provided that at least one of the residues represents a methoxy or ethoxy group.

4. The binder composition of claim 1 wherein said alkoxysilyl groups are incorporated into component b) by the reaction of isocyanate groups with amino-functional alkoxysilyl groups which are obtained by reacting amino-functional alkoxysilyl compounds corresponding to formula I

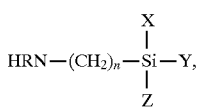

R represents hydrogen or a linear or branched alkyl group containing 1 to 4 carbon atoms, n represents an integer from 2 to 4 and X, Y and Z represent identical or different organic residues containing 1 to 30 carbon atoms, provided that at least one of the residues represents an alkoxy group containing 1 to 4 carbon atoms.

with maleic or fumaric acid esters corresponding to formula II

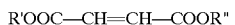

wherein

R' and R" represent identical or different alkyl residues containing 1 to 8 carbon atoms.

5. The binder composition of claim 1 wherein the molar ratio of alkoxysilyl groups to isocyanate groups in curing agent component b) is 0.008:1 to 0.5:1.

6. The binder composition of claim 2 wherein the molar ratio of alkoxysilyl groups to isocyanate groups in curing agent component b) is 0.008:1 to 0.5:1.

7. The binder composition of claim 3 wherein the molar ratio of alkoxysilyl groups to isocyanate groups in curing agent component b) is 0.008:1 to 0.5:1.

8. The binder composition of claim 4 wherein the molar ratio of alkoxysilyl groups to isocyanate groups in curing agent component b) is 0.008:1 to 0.5:1.

9. The binder composition of claim 1 wherein the molar ratio of alkoxysilyl groups to isocyanate groups in curing agent component b) is 0.008:1 to 0.2:1.

10. The binder composition of claim 2 wherein the molar ratio of alkoxysilyl groups to isocyanate groups in curing agent component b) is 0.008:1 to 0.2:1.

11. The binder composition of claim 3 wherein the molar ratio of alkoxysilyl groups to isocyanate groups in curing agent component b) is 0.008:1 to 0.2:1.

12. The binder composition of claim 4 wherein the molar ratio of alkoxysilyl groups to isocyanate groups in curing agent component b) is 0.008:1 to 0.2:1.

13. The binder composition of claim 1 wherein the molar ratio of alkoxysilyl groups to isocyanate groups in curing agent component b) is 0.015:1 to 0.2:1.

14. The binder composition of claim 2 wherein the molar ratio of alkoxysilyl groups to isocyanate groups in curing agent component b) is 0.015:1 to 0.2:1.

15. The binder composition of claim 3 wherein the molar ratio of alkoxysilyl groups to isocyanate groups in curing agent component b) is 0.015: to 0.2:1.

16. The binder composition of claim 4 wherein the molar ratio of alkoxysilyl groups to isocyanate groups in curing agent component b) is 0.015:1 to 0.2:1.

17. A coating or sealing composition containing the binder composition of claim 1.

* * * * *